(12) United States Patent
Ishida et al.

(10) Patent No.: US 6,643,575 B2
(45) Date of Patent: Nov. 4, 2003

(54) SEAT LOAD MEASURING SYSTEM THAT AUTOMATICALLY MAKES A SELF DIAGNOSIS AND ZERO POINT ADJUSTMENT IN RESPONSE TO A VEHICLE CRASH

(75) Inventors: Shoichi Ishida, Oobu (JP); Sadayuki Kuwahara, Bisai (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/175,401

(22) Filed: Jun. 20, 2002

(65) Prior Publication Data

US 2002/0198645 A1 Dec. 26, 2002

(30) Foreign Application Priority Data

Jun. 25, 2001 (JP) .................................. 2001-190892
Nov. 9, 2001 (JP) .................................. 2001-344717

(51) Int. Cl.[7] ............................................. B60R 21/32
(52) U.S. Cl. ........................ 701/45; 280/735; 180/273
(58) Field of Search ............................ 701/45, 46, 47; 180/271, 273, 282; 280/734, 735; 307/10.1

(56) References Cited

U.S. PATENT DOCUMENTS 6,382,667 B1 * 5/2002 Aoki ........................ 280/735
6,479,766 B2 * 11/2002 Gray et al. ................ 177/144
6,546,817 B1 * 4/2003 Aoki ..................... 73/862.474
6,577,023 B1 * 6/2003 Stanley et al. ............ 307/10.1

FOREIGN PATENT DOCUMENTS

JP    A 11-1153      1/1999
JP    A 2000-298057  10/2000

* cited by examiner

*Primary Examiner*—Gary Chin
(74) *Attorney, Agent, or Firm*—Oliff & Berridge, PLC (57) ABSTRACT

An occupant protection system of a vehicle comprises a seat load measuring subsystem and an occupant protection subsystem. The seat load measuring subsystem includes a controller and weight sensors attached to a vehicle seat, each weight sensor providing a weight signal. The controller provides information determined by a weight of an occupant of the vehicle seat. In response to a detection of a crash, the occupant protection subsystem provides a crash signal determined by a magnitude of the crash. In response to a reception of the crash signal, the controller automatically decides whether a weight sensor under diagnosis is normal, abnormal or intermediate between normal and abnormal on the basis of a level of the crash signal and the weight signals obtained from the weight sensor before and after the crash.

34 Claims, 10 Drawing Sheets

FIG. 2

FIG. 6 DIAGNOSIS MAP 110

FIG. 9 DIAGNOSIS MAP 120

FIG. 10

FIG. 11
DIAGNOSIS PARAMETER SET

SEAT LOAD MEASURING SYSTEM THAT AUTOMATICALLY MAKES A SELF DIAGNOSIS AND ZERO POINT ADJUSTMENT IN RESPONSE TO A VEHICLE CRASH

BACKGROUND OF THE INVENTION

1. Field of the Invention

The invention generally relates to a vehicle occupant protection system for securing the safety of a vehicle occupant or occupant of a vehicle seat and, more specifically, to a seat load measuring system for use in such a vehicle occupant protection system and for measuring the load weight a vehicle seat bears or the weight of the occupant of the vehicle seat.

2. Description of the Prior Art

Vehicles have become equipped with seat belt systems and air bag systems as vehicle occupant protection devices. In order to enhance the performance of such devices, attempts are being made to control the operation of each vehicle occupant protection device in response to the weight of the occupant of a vehicle seat equipped with the vehicle occupant protection device as well as a detection of the occurrence of a vehicle crash. For example, the quantity of air bag deploying gas, the deploying speed of air bags and/or the pretension of seat belts are controlled in response to the occupant's weight.

Figure 1:
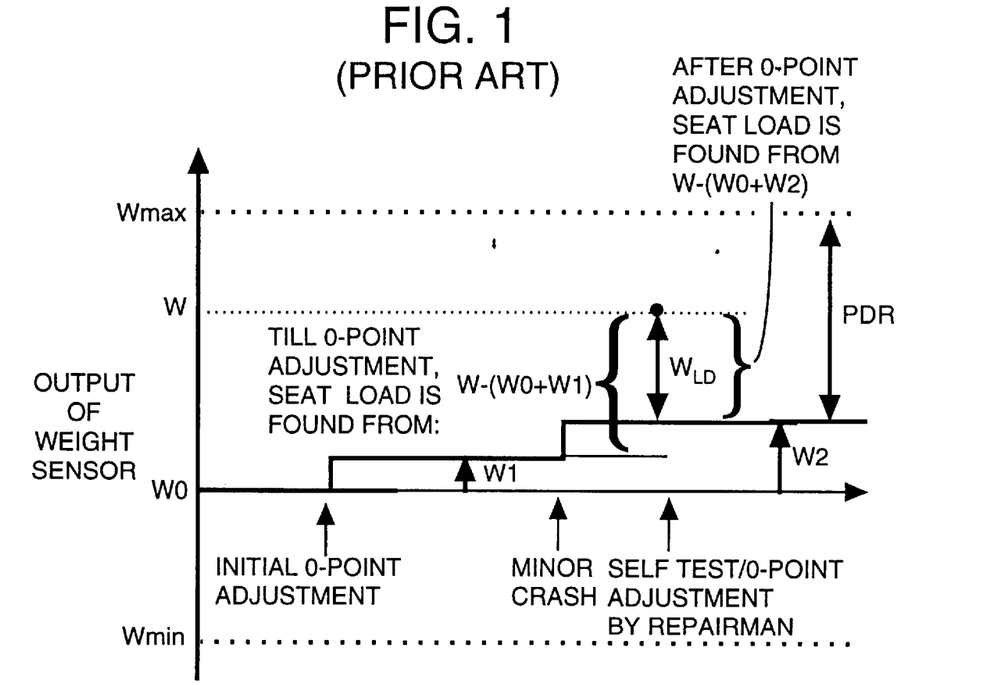
FIG. 1 is a diagram showing a conventional way of determining the seat load component $W_{LD}$ posed on each of the weight sensors from the output W of the weight sensor.

Generally, a seat load measuring system provided for a vehicle seat comprises four weight sensor assemblies and a hub assembly for collecting the weight sensor assembly outputs and providing an output signal determined by the weight of the occupant of the vehicle seat. FIG. 1 is a diagram showing a conventional way of determining the seat load component $W_{LD}$ posed on each of the weight sensors from the output W of the weight sensor.

In FIG. 1, the horizontal axis indicates time and the vertical axis indicates the output W of the weight sensor. It is assumed in this figure that the used sensors are capable of measuring not only the pressure (i.e., the positive pressing force forward the sensor) but also the negative pressure or the tension. The least upper bound and the greatest lower bound of the weight sensor output are indicated by dotted lines Wmax and Wmin, respectively. A weight level W0 indicates the output level of a weight sensor assembly measured without applying any load thereto. After installing a seat assembly which includes the seat load measuring system in a vehicle under manufacturing, the output W0+W1 of each weight sensor assembly which includes a seat weight component W1 applied to the weight sensor assembly is stored as a zero point in the weight measuring hub assembly. Thereafter, the seat load (i.e., the load applied to a seat) is obtained by summing up seat load components given by the four weight sensor assemblies used for the seat. The seat load component for each weight sensor assembly is calculated as W−(W0+W1) from the output W of the sensor assembly and the stored zero point W0+W1 for the sensor assembly.

However, the zero point of one or more weight sensor assembly may deviate far from the stored value W0+W1 to a value W0+W2 due to any cause such as a vehicle crash or distortion of any rigid member of the seat which is caused by the lowering of durability. In such a case, if the seat load component is still determined by the expression W−(W0+W1) using the old correction value W1, this causes an error of W2−W1. Further, if the deviation W2 is too large, which means that the positive dynamic range (PDR) is narrower than a necessary range, then the output of the weight sensor may be saturated for a large load. In this case, the seat assembly needs a disassembly and adjustment or the substitution of a new one.

Thus, if a motor vehicle has experienced any vehicle crash, it is necessary to make a test to see how much (W2−W1) the zero point of each weight sensor has deviate from the current position (W1) and whether the deviation quantity W2−W1 is in a tolerable range or not. Doing this enables the user of the vehicle to take an appropriate measure in accordance with the test results.

In order to meet the needs, we disclosed "Seat Load Measuring System with Zero point-adjusting Capability" in Japanese patent application No. 2001-196790. In this system, the zero point is adjusted by a repairman using a command input device. (This Japanese application is not yet published, and is thus not prior art to the present application.)

Aoki disclosed "Diagnostic Method for Seat Load Measuring Device" in Japanese patent unexamined publication No. 2000-298057 (October, 2000). In this device, the first output from a weight sensor with no load thereon is measured; the second output from the weight sensor with a predetermined load thereon is measured; a test is made to see if the difference between the first and second output values is within a predetermined value; and if not, an alert signal indicative of abnormality is issued to the user.

However, in the above-mentioned systems, the zero point adjustment or the device diagnosis has to be made by a repairman using a test weight of a predetermined weight and/or command input device as shown in FIG. 1. In other words, even if any seat load measuring device is abnormal, the abnormality can not be found until the user has the vehicle examined by a repairman, which can brought a worst case where the occupant protection system is activated under the abnormal state of the seat load measuring device. Further, seat load measurements are conducted on the basis of the zero points the values of which might have deviated from the values set in the last zero point adjustment until the zero points of the seat load measuring devices are adjusted by a repairman.

Therefore it is an object of the invention to provide a seat load measuring system that automatically makes a self-diagnosis and, if necessary, zero point adjustment without using a test weight in response to a vehicle crash.

SUMMARY OF THE INVENTION

According to an aspect of the invention, there is provided an occupant protection apparatus of a motor vehicle provided with a seat load measuring system capable of automated self-diagnosis and/or zero point adjustment at the time of crash. The occupant protection system includes a seat load measuring subsystem. The seat load measuring subsystem includes a plurality of weight sensors attached to a vehicle seat. Each of the weight sensors provides a weight signal responsive to a weight load applied to the weight sensor. The occupant protection system further includes at least one crash sensor for outputting the magnitude of a crash of the vehicle; a controller (31 in FIG. 2), responsive to the magnitude of the crash for providing a crash signal determined by the magnitude and, responsive to a decision that the crash signal has reached a predetermined level for providing control information on the basis of the weight signals from the weight sensors; and one or more occupant protection portions which each use an air bag, a seat belt or the like to provide a protection in response to the control information. The seat load measuring subsystem further includes a control portion (21 in FIG. 2) responsive to a reception of the crash signal for automatically making a diagnosis on each weight sensor or a zero adjustment of each weight sensor.

According to another aspect of the invention, a seat load measuring system for use in an occupant protection system of a vehicle is provided. The occupant protection system includes a crash detecting portion responsive to a detection of a crash for providing a crash signal determined by the magnitude of the crash and a portion responsive to a decision that said crash signal has reached a predetermined level for executing a protection operation on the basis of control information provided by the seat load measuring system. The seat load measuring system includes: a plurality of weight sensors attached to a vehicle seat, each weight sensor providing a weight signal responsive to a weight load applied to each weight sensor, the weight signal being used either as the control information or for generating the control information; and a controller responsive to a reception of the crash signal for automatically making a diagnosis on each weight sensor or a zero adjustment of each weight sensor.

According to a further aspect of the invention, an integrated circuit for use in an occupant protection system of a vehicle is provided. The occupant protection system includes a plurality of weight sensors attached to a vehicle seat, each weight sensor providing a weight signal responsive to a weight load applied to thereto; a crash sensor for providing the magnitude of a crash; and an occupant protection portion responsive to control information from the external for providing a protection. The integrated circuit includes a first portion responsive to the magnitude of the crash for providing a crash signal determined by the magnitude of the crash; a second portion responsive to a decision that the crash signal has reached a predetermined level for generating the control information on the basis of the weight signals from the plurality of weight sensors; a third portion responsive to a reception of the crash signal for automatically making a diagnosis on each weight sensor or a zero adjustment of the each weight sensor.

In a preferred embodiment of the invention, the seat load measuring subsystem further includes: a decision portion for deciding whether a diagnosis is necessary or not; a set of parameters of which at least a part is used as a criterion for diagnosis based on the crash signal; and a diagnosis portion, responsive to a decision that a diagnosis is necessary, for deciding whether each weight sensor is normal, abnormal or intermediate between normal and abnormal on the basis of the set of parameters. If a diagnosis is not necessary, the seat load measuring subsystem makes a zero adjustment of each weight sensor.

The decision portion may include an auxiliary sensor portion for detecting the presence or the position of the occupant of the vehicle seat.

If the diagnosis portion decides that each weight sensor is intermediate between normal and abnormal, then the seat load measuring subsystem makes a zero adjustment of each weight sensor.

If the diagnosis portion decides that a weight sensor is abnormal, then the seat load measuring subsystem preferably provides an alert to a user.

The diagnosis portion preferably decides that each weight sensor is normal if the level of the crash signal is smaller than a first predetermined value and that each weight sensor is abnormal if the level of the crash signal is larger than a second predetermined value which is larger than the first predetermined value.

In the preferred embodiment, the above-mentioned set of parameters preferably includes parameters used as a criterion for diagnosis based on the crash signal and the weight signals obtained from each weight sensor before and after crash. In this case, if the level of the crash signal is in a range from the first predetermined value to the second predetermined value and if the difference between the weight signals before and after the crash is in a larger weight sensor output range defined in the parameter set but is out of a smaller weight sensor output range which is defined in the parameter set and completely included in the larger weight sensor output range, then the diagnosis portion preferably decides that each weight sensor is intermediate between normal and abnormal.

Alternatively, if the level of the crash signal is in a range from the first predetermined value to the second predetermined value, then, regardless of the output level of each weight sensor, the diagnosis portion may decide that each weight sensor is intermediate between normal and abnormal.

In one embodiment, the preset larger and smaller weight sensor output ranges remain constant throughout the range from the first predetermined value to the second predetermined value.

In one modification of just mentioned embodiment, the preset larger and smaller weight sensor output ranges, when expressed in a graph, change in tapered shapes as the level of the crash signal increases from the first predetermined value to the second predetermined value.

Some other modifications are disclosed.

BRIEF DESCRIPTION OF THE DRAWING

Further objects and advantages of the present invention will be apparent from the following description of the preferred embodiments of the invention as illustrated in the accompanying drawing, in which.

Throughout the drawing, the same elements when shown in more than one figure are designated by the same reference numerals.

DETAILED DESCRIPTION OF THE PREFERRED EMBODIMENTS

Figure 2:
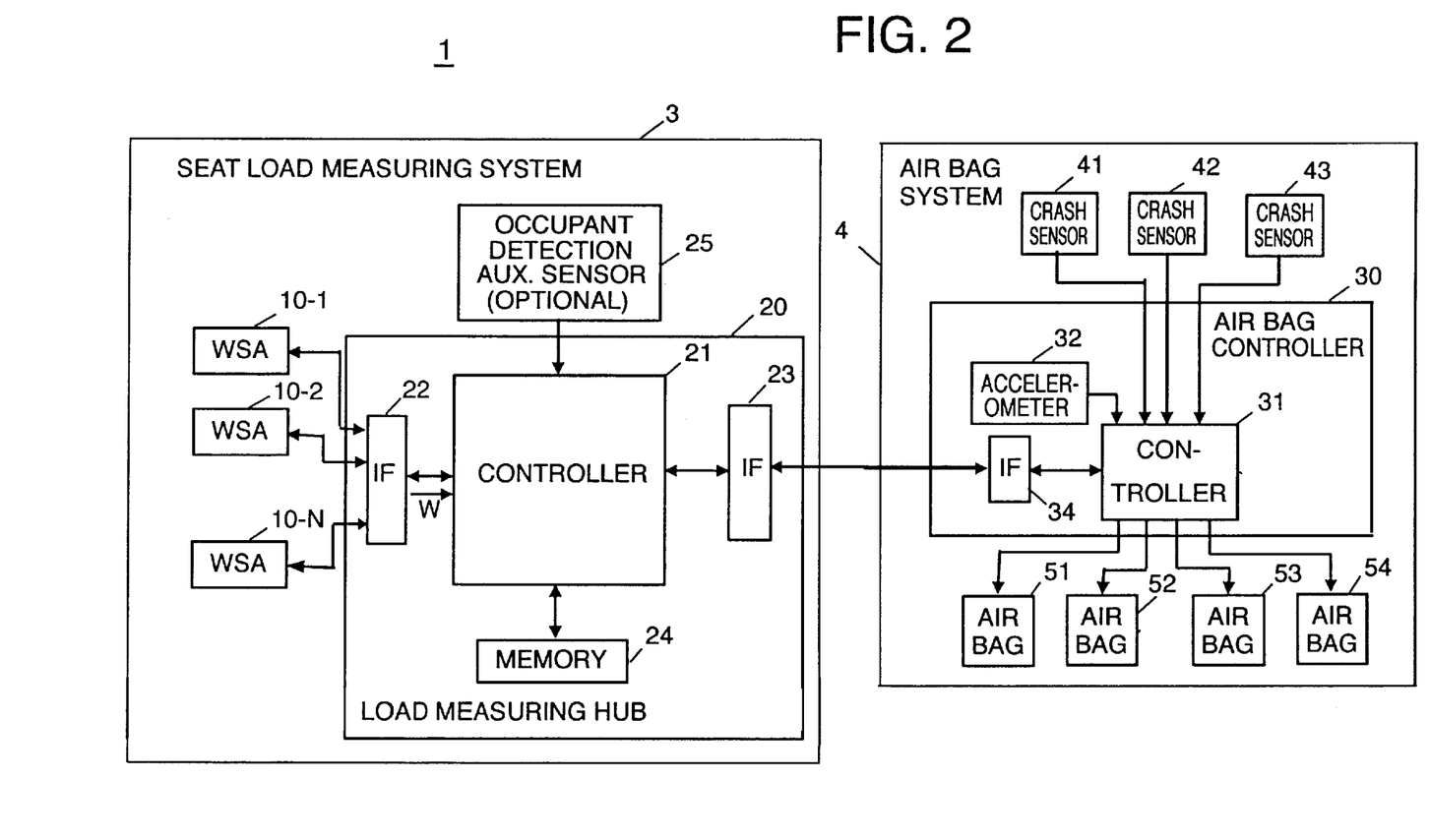
FIG. 2 is a schematic block diagram showing an exemplary arrangement of an air bag portion 1 of an exemplary occupant protection system using a seat load measuring system 3 that automatically makes a self diagnosis and zero point adjustment in accordance with the principles of the invention.

FIG. 2 is a block diagram showing an air bag portion 1 of an exemplary occupant protection system using a seat load measuring system 3 that automatically makes a self-diagnostic and zero point adjustment in accordance with the principles of the invention. In FIG. 2, air bag portion 1, which is provided in a vehicle, comprises air bag system 4 and seat load measuring system 3 which is attached to a vehicle seat and electrically connected to air bag system 4. Though FIG. 2 shows only one seat load measuring system 3 for the sake of simplicity, seat load measuring system 3 is preferably provided to each of the seats that need protection by air bag. Also, seat load measuring system 3 is connected only to air bag system 4 in FIG. 2. However, each seat load measuring system 3 may also supply its output to any other protection portion such as a seat belt controller (not shown).

Seat load measuring system 3 comprises N (typically 4) weight sensor assemblies 10-1, 10-2 . . . 10-$n$ and seat load measuring hub assembly 20. Weight sensor assemblies 10 comprise weight sensors or Cu—Ni strain gages attached to the seat frame of the assistant driver's seat (not shown). Seat load measuring system 3 preferably includes auxiliary occupant detection sensor system 25 which includes, for example, a mat sensor provided on an urethane seat and having a plurality of weight sensors arranged in a matrix, each weight sensor being connected to seat load measuring hub assembly 20. Since auxiliary occupant detection sensor 25 is used for detecting the presence or the position of the seat occupant, auxiliary occupant detection sensor 25 may be any suitable optical sensor, which includes CCD (charge coupled device). Seat load measuring hub assembly 20 comprises communication interface (IF) 22 for communicating with N weight sensor assemblies 10-1, 10-2, . . . , and 10-$N$; controller 21 for providing an output signal based on the weight of the seat load; interface 23 for enabling controller 21 to communicate with air bag system 4; and memory 24 for storing various data for use in the processing by controller 21. Controller 21 collects the output signals from N weight sensor assemblies 10 via interface 22 and provides a piece of information determined on the basis of the sensor assembly 10 output signals. The piece of information may be indicative of the seat load status, which is, for example, one of adult, child and unoccupancy. Controller 21 also performs automated self diagnosis and zero point adjustment as detailed later.

Air bag system 4 comprises crash sensors 41 through 43 for detecting a crash; air bag controller 30 for controlling the deployment of the air bags; and front and side air bags 51 and 52 for the not-shown driver's seat and front and side air bags 53 and 54 for the not-shown assistant driver's seat. Crash sensors 41 through 43 are crash severity sensor 41 set up in the front section and side crash sensors 42 and 43 set up in the doors of the driver's seat side and the assistant driver's seat side. Crash sensors 41 through 43 provide output signals proportional to the magnitude of a crash. Air bag controller 30 comprises accelerometer 32 for measuring the acceleration; CPU-based controller 31; and communication interface 34 for enabling controller 31 to communicate with controller 21 of seat load measuring system 3 via interface 23.

Principles of the Invention

Figure 3:
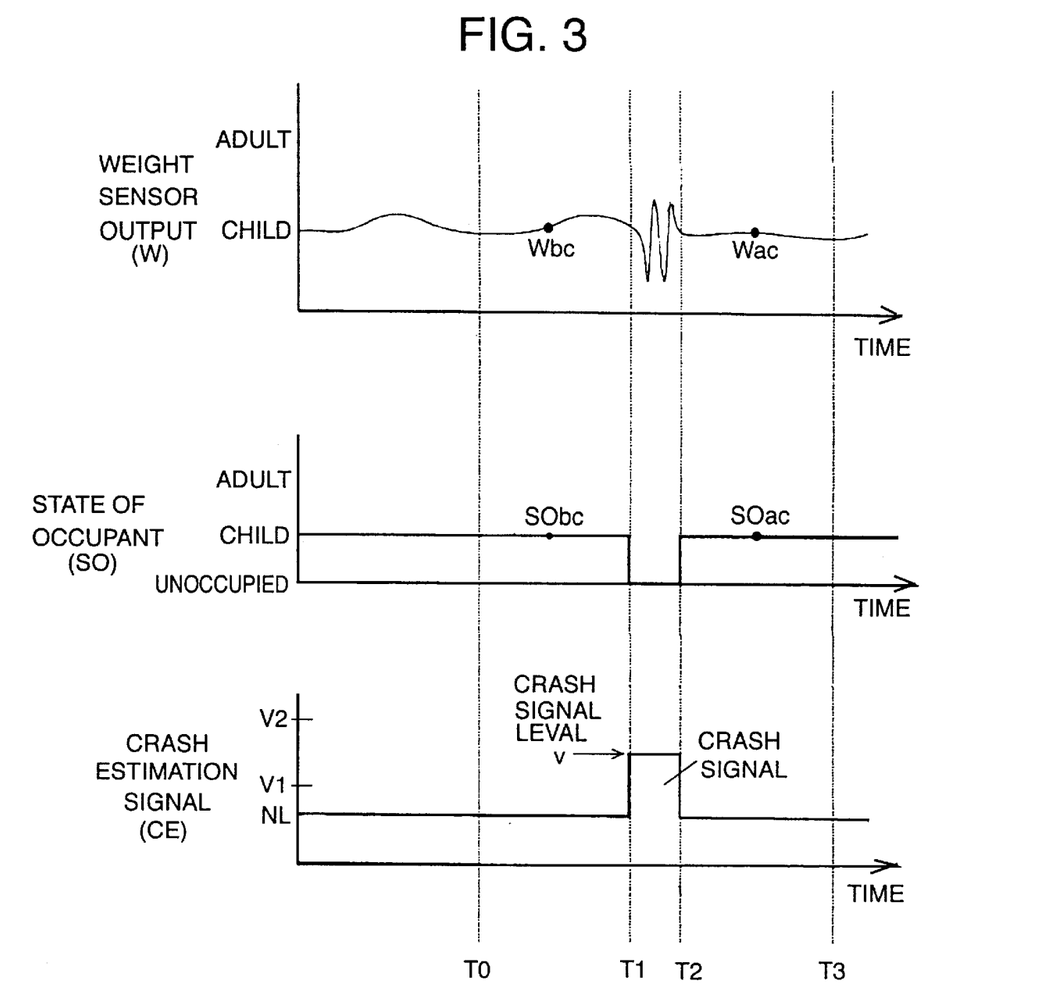
FIG. 3 is a diagram showing waveforms of quantities used in the operation of the air bag portion 1.
Figure 4:
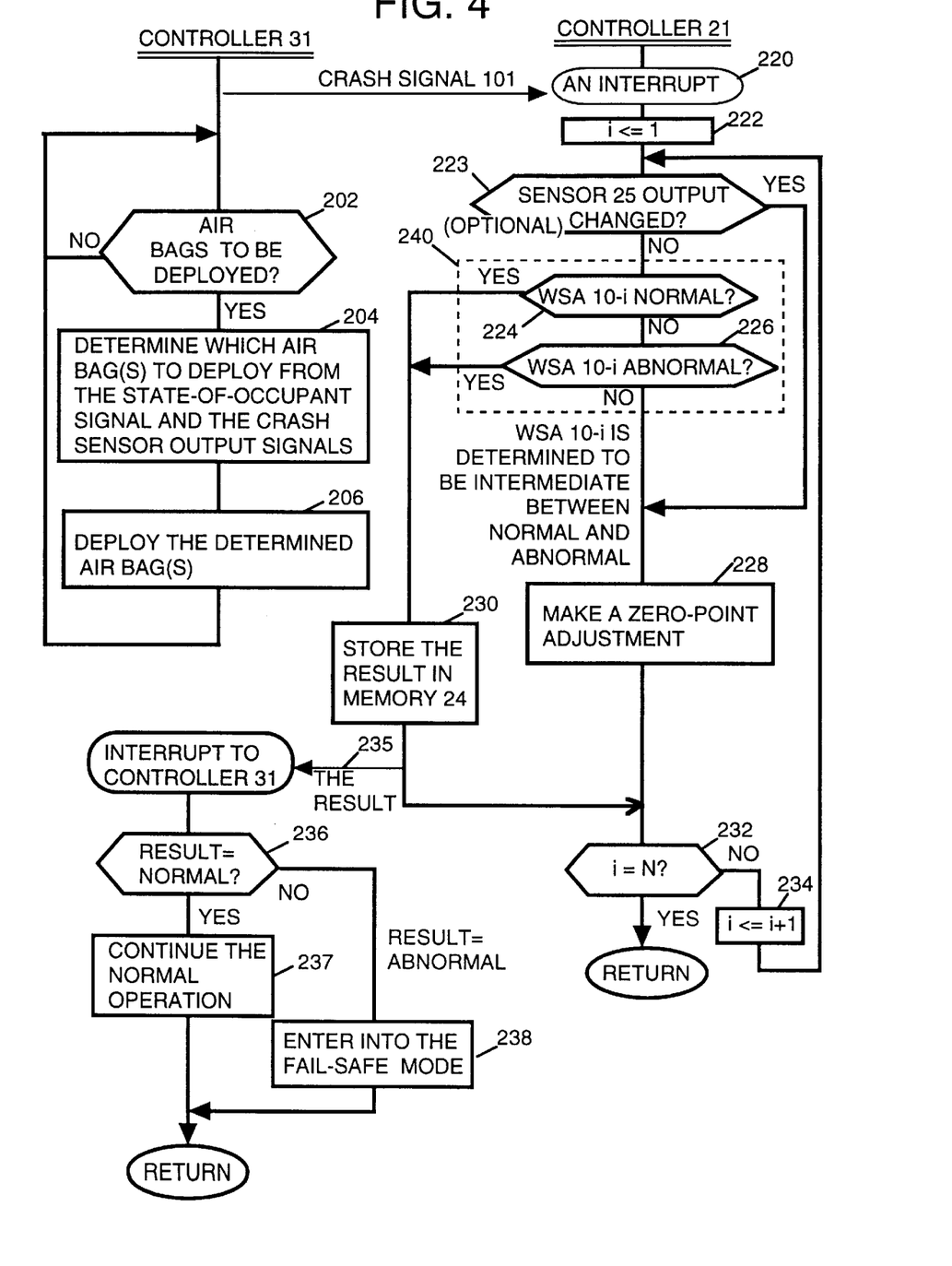
FIG. 4 is a diagram including three flowcharts showing operations executed by controllers 31 and 21 in accordance with the principles of the invention.

Referring to FIGS. 3 and 4, the principles of the invention are described in the following. FIG. 3 is a diagram showing waveforms of quantities used in the operation of the air bag portion 1. FIG. 4 is a diagram including three flowcharts showing operations executed by controllers 31 and 21 in accordance with the principles of the invention. In FIG. 3, the horizontal axis is a time axis. Times T1 and T2 indicate the beginning and the end of a crash. FIG. 3 shows an exemplary weight signal W from one of the weight sensor assemblies 10 attached to the assistant driver's seat on which a child is sitting. Generally, the weight signal W is proportional to the weight of the seat occupant and gently varies in ordinary (or non-crashing) state. If the occupant of the assistant driver's seat were adult, then the weight signal W curve should have been drawn at a much higher level such as is labeled 'ADULT'. At the moment of a crash or the moment from T1 to T2, the weight signal W heavily vibrates. The weight signals W1 through WN from WSA 10-1 through 10-N are processed by controller 21 to provide a state-of-occupant (SO) signal as shown in the middle part of FIG. 3. In this specific example, the SO signal indicates the seat occupant is a child. The SO signal is passed to air bag system controller 31 through interfaces 23 and 34. The SO signals just before and after a crash are expressed as before-and-after-crash SO signals SObc and SOac, respectively.

On the other hand, crash sensors 41 through 43 and accelerometer 32 supply respective output signals to air bag system controller 31, which in turn processes these signals to generate respective crash estimation (CE) signals for crash sensors 41 through 43, only one of which is shown in the lower part of FIG. 3. If a vehicle crash causes the signals from one of crash sensors 41 through 43 and accelerometer 32 to exceed respective first predetermined crash levels, then air bag controller 31 turns the CE signal into a higher-level signal called "crash signal" as shown in the lower part of FIG. 3. The level of the crash signal and the crash signal itself are denoted as "v". The crash signal v of a level VI indicates that the deployment of any air bag is not necessary regardless of the values of other sensor outputs. Also, the crash signal v of a level V2 indicates that the deployment of any air bag is not avoidable regardless of the values of other sensor outputs. Since a crash signal can be generated for each of the crash sensors 41 through 43, the crash signal(s) is(are) preferably passed to load measuring system controller 21 so as to be identified with relevant crash sensor(s). The crash signal(s) is(are) sent, for example, in a predetermined order or with crash sensor ID(s) which has(have) caused the crash signal(s).

Normally, in the above-described manner, air bag controller 31 making tests to see if any air bag(s) is(are) to be deployed in step 202. These tests are made by comparing the crash signal(s) with respective second predetermined crash levels. If so, controller 31 determines which air bag(s) to deploy from the state-of-occupant signal and the output signals from the weight sensor assemblies 10-1 through 10-N in step 204 and deploys the determined air bag(s) in step 206. Then, controller 31 returns to step 202.

It is assumed that load measuring system controller 21 is usually collecting and storing the weight sensor 10 outputs in memory 24 and generating the SO signal. The weight signals obtained from WSA 10-1 (for example) before and after a crash are referred to as "before-and-after-crash weight signals" and denoted as "W1$bc$" and "W1$ac$", respectively. The difference between before-and-after-crash weight signals from WSA 10-$i$ is expressed as $\Delta$Wi (=Wiac–Wibc). Controller 21 also reads and stores the output from auxiliary occupant detection sensor 25 in memory 24. When the crash estimation signal (CE) from air bag system controller 31 changes to the crash signal v (or abruptly rises from the normal level labeled "NL" in FIG. 3), an interrupt signal is preferably applied to controller 21. In response to the interrupt signal (shown by a reference numeral "220" in FIG. 4), then controller 21 enters into an interrupt processing (steps 222 through 234) which executes self diagnosis and, if necessary, zero point adjustment of the seat load measuring system.

Specifically, seat load measuring system 3 controller 21 sets a counter i to an initial value "1" for example in step 222. Before self diagnosis operation 240, it is preferably to make a test in step 223 to see if an output signal obtained during a period from T2 to T3 from the auxiliary occupant detection sensor 25 has changed as compared with the last output stored in memory 24. If so, since it means that the presence and/or position of the occupant has changed and it can be thought the difference between before-and-after-crash weight signals from each WSA 10-$i$ or the difference between calculation results before and after the crash is not caused by the WSA 10-$i$ system, considering that there is no need of self diagnosis, controller 21 proceeds to step 228. If the test result is NO in step 223, then controller 21 executes the self diagnosis operation 240. In this way, executing decision step 223 may enable the omission of the self diagnosis operation 240. However, step 223 may be omitted.

If the self diagnosis is to be executed, i.e., decision step is omitted or the test result is NO in decision step 223, then controller 21 first makes a test to see if WSA 10-$i$ (in this case 10-1) is clearly normal in step 224. WSA 10-1 is judged to be clearly normal if the difference $\Delta$Wi between the before-and-after-crash weight signals from WSA 10-$i$ is smaller than a predetermined value and if the before-and-after-crash SO signals SObc and SOac are the same. If so, the test result is stored in memory 24 in step 230 and passed to the air bag controller 31 in step 235. Otherwise, controller 21 makes another test in step 226 to see if WSA 10-$i$ (in this case 10-1) is clearly abnormal. WSA 10-1 is judged to be clearly abnormal if the before-and-after-crash weight signal difference $\Delta$Wi is not smaller than a predetermined value or if the before-and-after-crash SO signals SObc and SOac are different from each other. If so, the test result is stored in memory 24 in step 230 and passed to the air bag controller 31 in step 235.

If the test results of both decision steps 224 and 226 are NO, it is determined that WSA 10-$i$ is intermediate between normal and abnormal and controller 21 makes a zero point adjustment of WSA 10-$i$ in step 228. The zero point adjustment is done by adding the before-and-after-crash weight signal difference $\Delta$Wi to the current weight correction value WCi stored in memory 24 for WSA 10-$i$. Thereafter, the weight component applied to WSA 10-$i$ is obtained as WSA 10-$i$ output (Wi) minus the updated weight correction value (WCi+$\Delta$Wi).

The above-described operation by controller 21 is executed for each of the WSA's 10-1 through 10-N (typically 10-4) through steps 232 and 234.

On the hand, in response to a reception of the test result of step 224 or 226, air bag controller 31 makes a test to see if the test result is normal in step 236. If so, then controller 31 continues its normal operation. Otherwise, controller 31 alerts the user to the abnormality of WSA 10-$i$ and enters into the fail-safe mode in step 238 and returns to the main routine.

Figure 5:
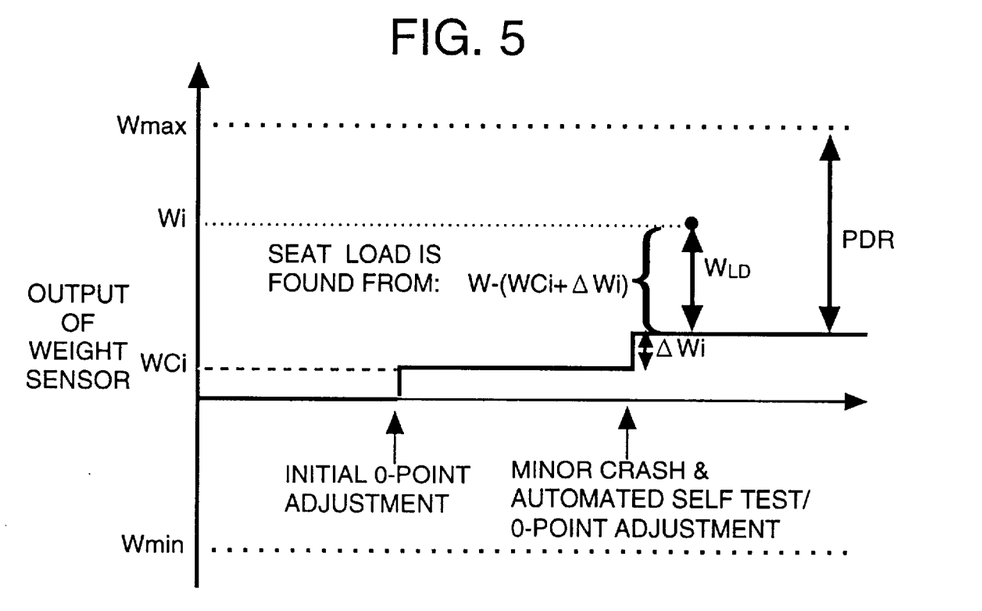
FIG. 5 is a diagram showing how the seat load is measured after a vehicle crash in accordance with the principles of the invention.

According to the principles of the invention, if a vehicle crash is detected, the seat load measuring system 3 or vehicle occupant protection system 1 automatically executes the diagnosis of the seat load measuring system and, if necessary, the zero point adjustment without any need of a reference weight for diagnosis or the aid by repairman as shown in FIG. 5. Since the self diagnosis and zero point adjustment are executed almost concurrently with a crash, the invention not only eliminates the need of user carrying the vehicle to a repair shop but also enhances the security very much for a period from the occurrence of the crash till the vehicle is brought to the repair shop.

Embodiment I

Figure 6:
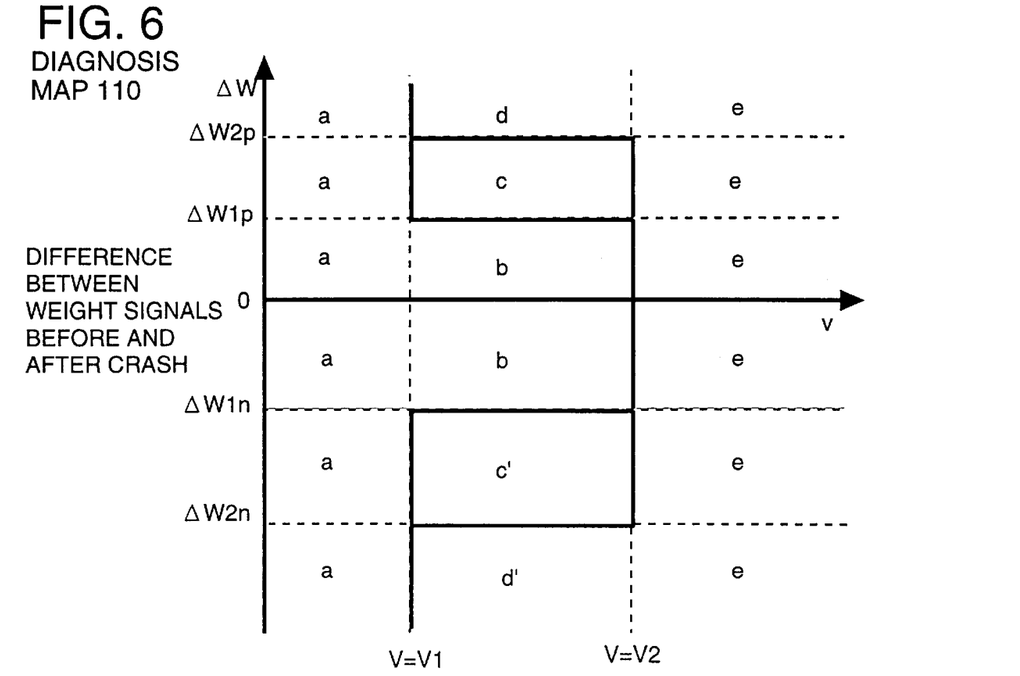
FIG. 6 is a diagram showing an exemplary diagnosis map of a basic type that defines the diagnostic criteria used in the self diagnosis operation in step 240 of FIG. 4.

FIG. 6 is a diagram showing an exemplary diagnosis map of a basic type that used defines the diagnostic criteria used in the self diagnosis operation in step 240 of FIG. 4. Diagnosis map 110 of FIG. 6 used for judging which each WSA 10-$i$ or entire WSA 10 system is normal, abnormal or intermediate between normal and abnormal. In FIG. 6, the abscissa indicates the level v of the above-mentioned crash signal and the ordinate indicates the difference between before-and-after-crash weight signals from WSA 10-$i$; i.e., $\Delta$Wi=Wiac–Wibc (see FIG. 3). However, since the same diagnosis map 110 is used for all of the WSA's 10 in this specific example, the WSA-distinguishing suffix 'i' is omitted in FIG. 6. The whole area in the map is vertically divided into three columns by lines defined by v=V1 and V2, which we have introduced in connection with the crash signal that occurs during the period from T1 to T2 in the crash estimation (CE) signal shown in FIG. 3. If the crash signal level v is smaller than the first predetermined level V1 or in a column labeled "a", then the WSA 10-$i$ system or the entire WSA 10 system (or the seat load measuring system 3) is judged to be clearly normal. If the crash signal level v is larger than the second predetermined level V2 or in a column labeled "e", then the WSA 10-$i$ system or the entire WSA 10 system 3 is judged to be clearly abnormal. A column lying from V1 to V2 is divided into:

block b which has the upper boundary $\Delta W = \Delta W1p$ and the lower boundary $\Delta W = \Delta W1n$;

block c which has the upper boundary ΔW=ΔW2p and the lower boundary ΔW=ΔW1p;

block c' which has the upper boundary ΔW=ΔW1n and the lower boundary ΔW=ΔW2n;

block d which has the lower boundary ΔW=ΔW2p (though block d also has the upper boundary ΔW=Wmax−Wmin, it has not to be considered); and block d' which has the upper boundary ΔW=ΔW2n (though block d' also has the lower boundary ΔW=Wmin−Wmax, it has not to be considered).

The first positive and negative boundary values ΔW1p and ΔW1n and second positive and negative boundary values ΔW2p and ΔW2n are such that if the diagnosis point defined by the diagnosis factors (the crash signal level v and the before-and-after-crash weight signal difference ΔW) is in block b, the WSA 10-$i$ system or the entire WSA 10 system 3 is judged to be normal; if the diagnosis point is in block d or d', the WSA 10-$i$ system or the entire WSA 10 system 3 is judged to be abnormal; and if the diagnosis point is in block c or c', the WSA 10-$i$ system or the entire WSA 10 system 3 is judged to be between normal and abnormal.

It is noted that the absolute values of the negative boundary values are preferably set larger than corresponding positive boundary values; i.e., $\Delta W1p < |\Delta W1n|$ and $\Delta W2p < |\Delta W2n|$. Doing this can make the diagnosis map closer to reality. This is because the seat weight is hardly thought to increase due to a crash though the seat weight may decrease by the occupant being sent flying off the seat due to the crash. However, the absolute values of the negative boundary values may be set equal to corresponding positive boundary values; i.e., the boundary values may be such that $\Delta W1p=|\Delta W1n|$ and $\Delta W2p=|\Delta W2n|$.

Figure 7:
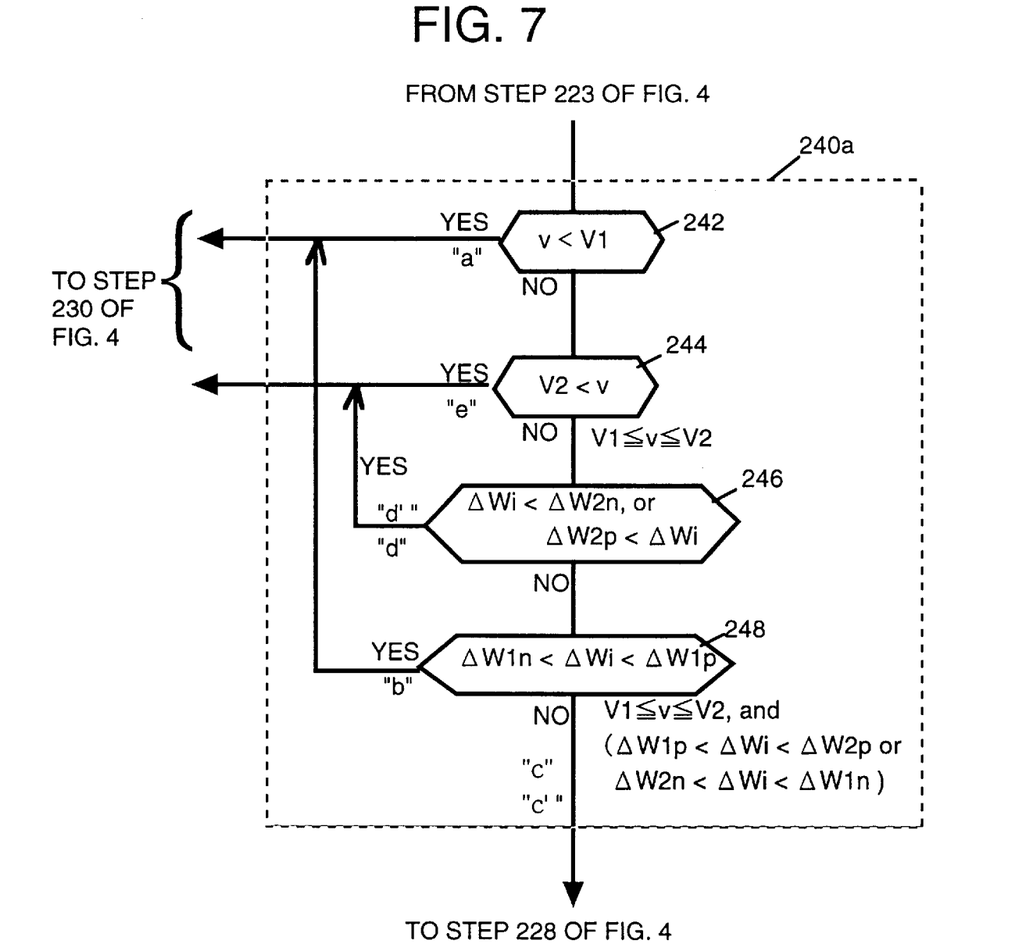
FIG. 7 is a partial flowchart which can be replaced with the diagnosis process part 240 in FIG. 4 and which shows an operation for making a self diagnosis of the seat load measuring system 3 on the basis of the diagnostic criteria defined by the basic diagnosis map of FIG. 6.

If the diagnosis criterions as defined by just-described diagnosis map 110 is applied to the diagnosis process 240 of FIG. 4, we will obtain a partial flowchart 240a as shown in FIG. 7. In FIG. 7, controller 21 makes a test to see if the crash signal level v is smaller than the first predetermined level V1 in step 242. If so, which corresponds to the case of column "a", then controller 21 proceeds to step 230 of FIG. 4. Otherwise, controller 21 proceeds to step 244, where controller 21 makes a test to see if the crash signal level v is larger than the second predetermined level V2 in step 244. If so, which corresponds to the case of column "e", then controller 21 proceeds to step 230 of FIG. 4. Otherwise, controller 21 proceeds to step 246, where controller 21 makes a test to see if the before-and-after-crash weight signal difference ΔWi for WSA 10-$i$ is either smaller than the second negative boundary value V2n or larger than the second positive boundary value V2p. If so, which corresponds to the case of column "d'" or "d", then controller 21 operates in the same way as in case of YES in decision step 244. Otherwise, controller 21 proceeds to step 248, where controller 21 makes a test to see if the before-and-after-crash weight signal difference ΔWi for WSA 10-$i$ is larger than the first negative boundary value ΔW1n and smaller than the first positive boundary value ΔW1p. If so, which corresponds to the case of column "b", then controller 21 operates in the same way as in case of YES in decision step 242. Otherwise, it corresponds to the case of column c or c' and, accordingly, controller 21 ends the process 240a to proceed to step 228 of FIG. 4.

As described above, a diagnosis on the normalcy/abnormalcy of the WSA 10-$i$ system or the entire WSA 10 system 3 is made on the basis of not only the weight signal difference but also the crash signal, which makes the diagnosis more accurate as compared with conventional diagnoses which are only based on the weight signal difference.

Figure 8:
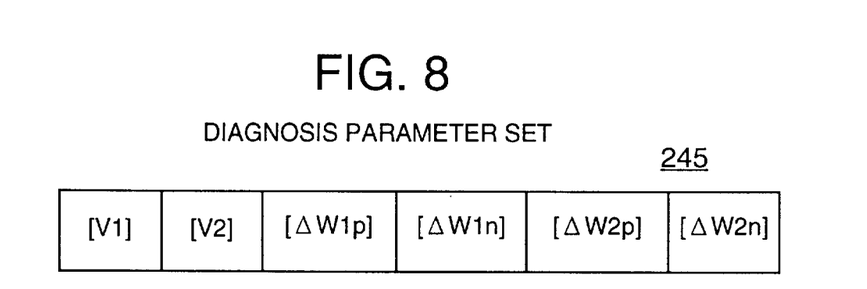
FIG. 8 is a diagram showing an exemplary structure of a basic-type diagnosis parameter set characterizing the diagnosis map of FIG. 6.

In FIG. 7, steps are shown as if diagnosis parameters V1, V2, ΔW1p, ΔW1n, ΔW2p and ΔW2n were actually written in the program of process 240a. Alternatively, the diagnosis parameters may be stored en bloc as a diagnosis parameter set in memory 24 and, instead of using a desired actual parameter, the program may use information indicative of the location where the desired actual parameter is stored. This enables a system intended for a particular vehicle model to be easily modified for any other model by replacing the diagnosis parameter set with a diagnosis parameter set adapted to the other model. An example of such a diagnosis parameter set is shown in FIG. 8. In FIG. 8, [X] indicates the actual value of a variable X.

Embodiment II

Figure 9:
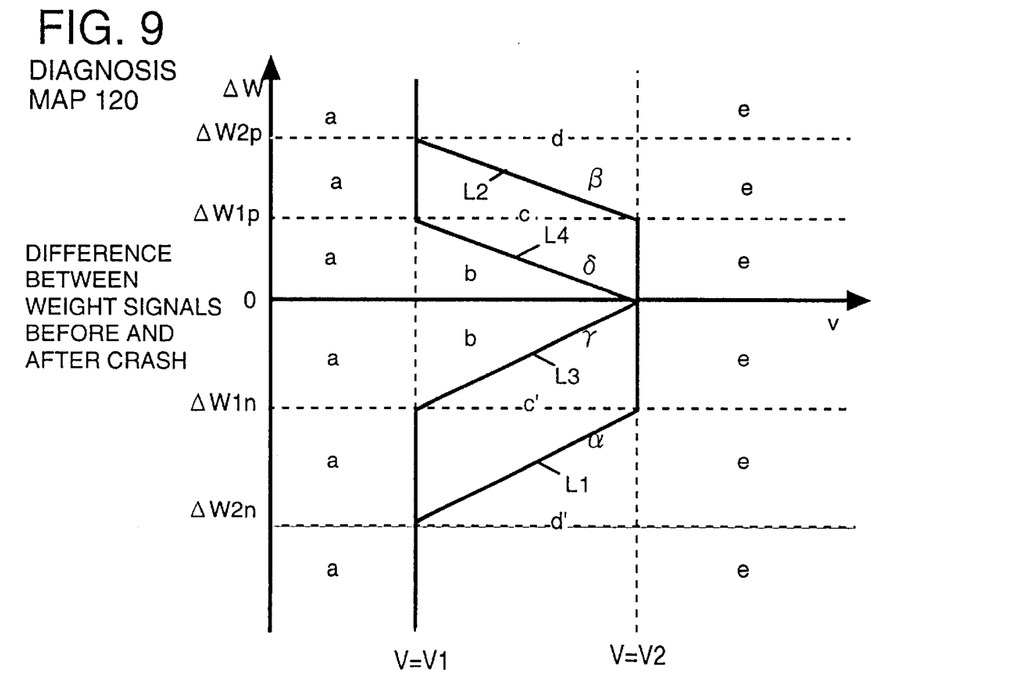
FIG. 9 is a diagram showing an exemplary diagnosis map of an improved-type that can be used in step 240 of FIG. 4.

FIG. 9 is a diagram showing an exemplary diagnosis map of an improved-type that can be used in step 240 of FIG. 4. The diagnosis map 120 of FIG. 9 is identical to diagnosis map 110 of FIG. 6 except that in the column defined by vertical lines V=V1 and V2;

the horizontal line ΔW=ΔW2n has been replaced with a slanting line L1:

$$\Delta W = \Delta W2n + \alpha(v-V1);$$

the horizontal line ΔW=ΔW2p has been replaced with a slanting line L2:

$$\Delta W = \Delta W2p + \beta(v-V1);$$

the horizontal line ΔW=ΔW1n has been replaced with a slanting line L3:

$$\Delta W = \Delta W1n + \gamma(v-V1); \text{ and}$$

the horizontal line ΔW=ΔW1p has been replaced with a slanting line L4:

$$\Delta W = \Delta W1p + \delta(v-V1),$$

where α trough γ are the gradients of respective slanting lines L1 through L4 and expressed as follows:

$$\alpha = (\Delta W1n - \Delta W2n)/(V2-V1),$$

$$\beta = -(\Delta W2p - \Delta W1p)/(V2-V1),$$

$$\gamma = -\Delta W1n/(V2-V1), \text{ and}$$

$$\delta = -\Delta W1p/(V2-V1).$$

As seen from the foregoing, the decision boundaries L1 through L4 vary in proportion to the crash signal value v in a range from V1 to V2. This makes the diagnosis map further closer to reality.

Figure 10:
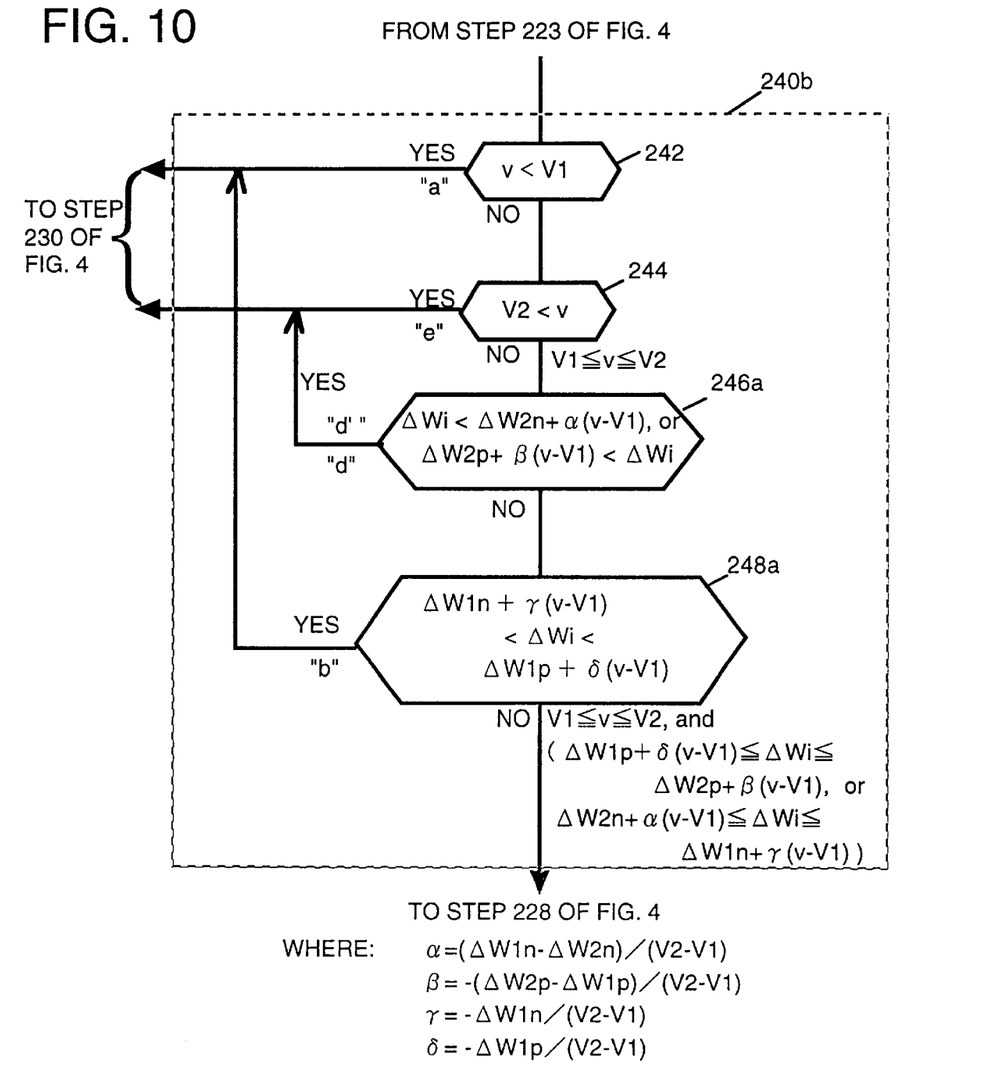
FIG. 10 is a partial flowchart which can be replaced with the diagnosis process part 240 in FIG. 4 and which shows a self diagnosis operation based on the improved-type diagnosis map of FIG. 8.

FIG. 10 is a partial flowchart which can be replaced with the diagnosis process part 240 in FIG. 4 and which shows a self diagnosis operation based on the improved-type diagnosis map of FIG. 9. Diagnosis process 240b of FIG. 10 is identical to diagnosis process 240a of FIG. 7 except that the following replacements have been done in FIG. 10;

$$\Delta W2n \rightarrow \Delta W2n + \alpha(v-V1),$$

$$\Delta W2p \rightarrow \Delta W2p + \beta(v-V1),$$

$$\Delta W1n \rightarrow \Delta W1n + \gamma(v-V1), \text{ and}$$

$$\Delta W1p \rightarrow \Delta W1p + \delta(v-V1).$$

Figure 11:
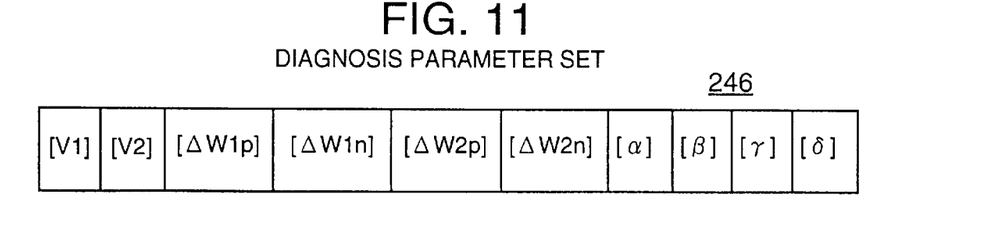
FIG. 11 is a diagram showing an exemplary structure of an improved-type diagnosis parameter set characterizing the improved-type diagnosis map of FIG. 9.

Also, the diagnosis parameters V1, V2, ΔW1p, ΔW1n, ΔW2p, ΔW2n and α through δ may be stored en bloc as a diagnosis parameter set as shown in FIG. 11.

Embodiment III

Figure 12A:
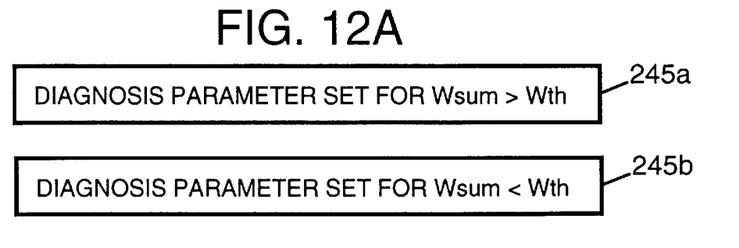
FIG. 12A is a diagram showing two diagnosis parameter sets used in a seat load measuring system in accordance with a third illustrative embodiment of the invention.
Figure 12B:
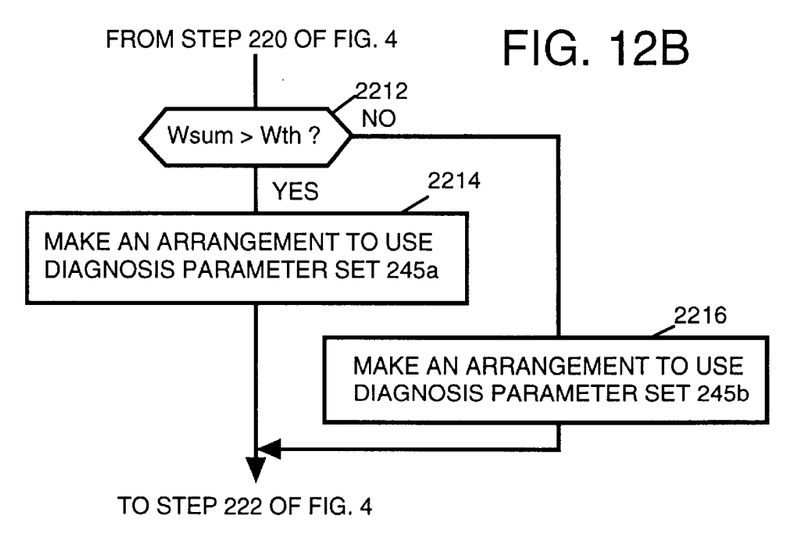
FIG. 12B is a partial flowchart which, when inserted between steps 220 and 222 in FIG. 4, provides a complete flowchart in which one of the two diagnosis parameter sets is used depending on the sum of the WSA 10 outputs in accordance with the third embodiment.

In the above-described embodiments, an identical diagnosis map or diagnosis parameter set has been used regardless of the sum (Wsum) of the weight signals W1 through WN. However, as shown in FIG. 12A, different diagnosis maps or different diagnosis parameter sets (245a and 245b in this specific example) may be used for Wsum>Wth and for Wsum<Wth (Wth is a threshold value). FIG. 12B is a partial flowchart which, when inserted between steps 220 and 222 in FIG. 4, provides a complete flowchart in which one of the two diagnosis parameter sets is used depending on the sum of the WSA 10 outputs in accordance with the third modification. In FIG. 12B, following step 220 of FIG. 4, controller 21 makes a test to see if the weight signal sum Wsum is larger that the threshold value Wth in step 2212. If so, controller 21 proceeds to step 2214 to make an arrangement to use a first diagnosis parameter set 245a by, for example, copying the first diagnosis parameter set 245a to a predetermined parameter buffer area (not shown), and then proceeds to step 222 of FIG. 4. Otherwise, controller 21 proceeds to step 2216 to make an arrangement to use a first diagnosis parameter set 245a by, for example, copying the second diagnosis parameter set 245b to the predetermined parameter buffer area (not shown), and then proceeds to step 222 of FIG. 4.

According to the third embodiment, even for Wsum>Wth, it is possible to make full use of the output range of the weight sensors which is relatively narrow for this case, while, for Wsum<Wth, it is also possible to make full use of the output range of the weight sensors which is relatively wide for this case.

Embodiment IV

Figure 13A:
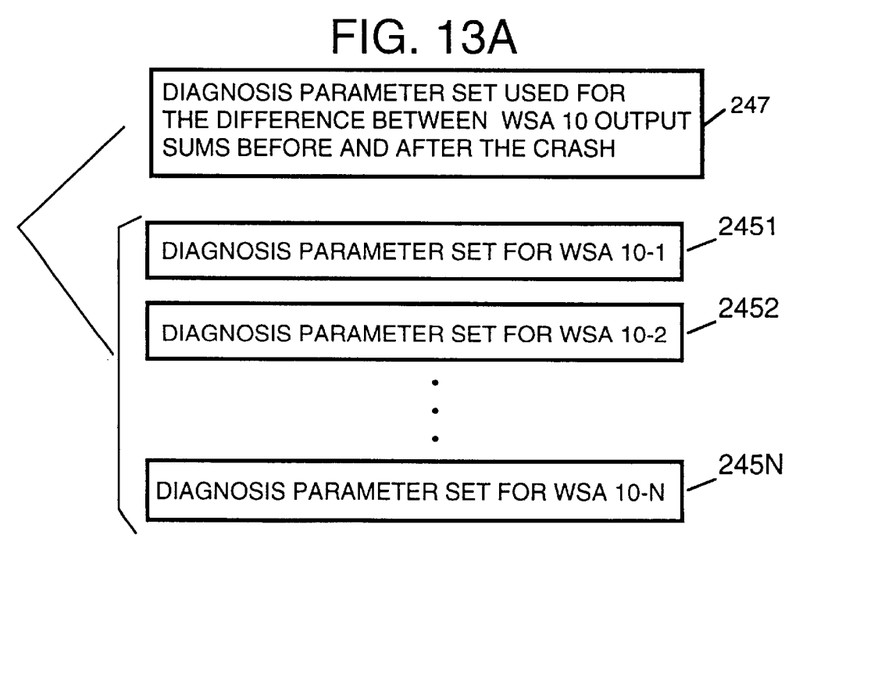
FIG. 13A is a diagram showing diagnosis parameter sets used in a seat load measuring system in accordance with a fourth illustrative embodiment of the invention.

FIG. 13A is a diagram showing diagnosis parameter sets used in a seat load measuring system in accordance with a fourth illustrative embodiment of the invention. In this embodiment, the seat load measuring system 3 uses a (global) diagnosis parameter set 247 for the difference ΔWsum between WSA 10 output sums before and after the crash, and N diagnosis parameter sets 2451 through 245N for WSA's 10-1 through 10-N as shown in FIG. 13A.

Figure 13B:
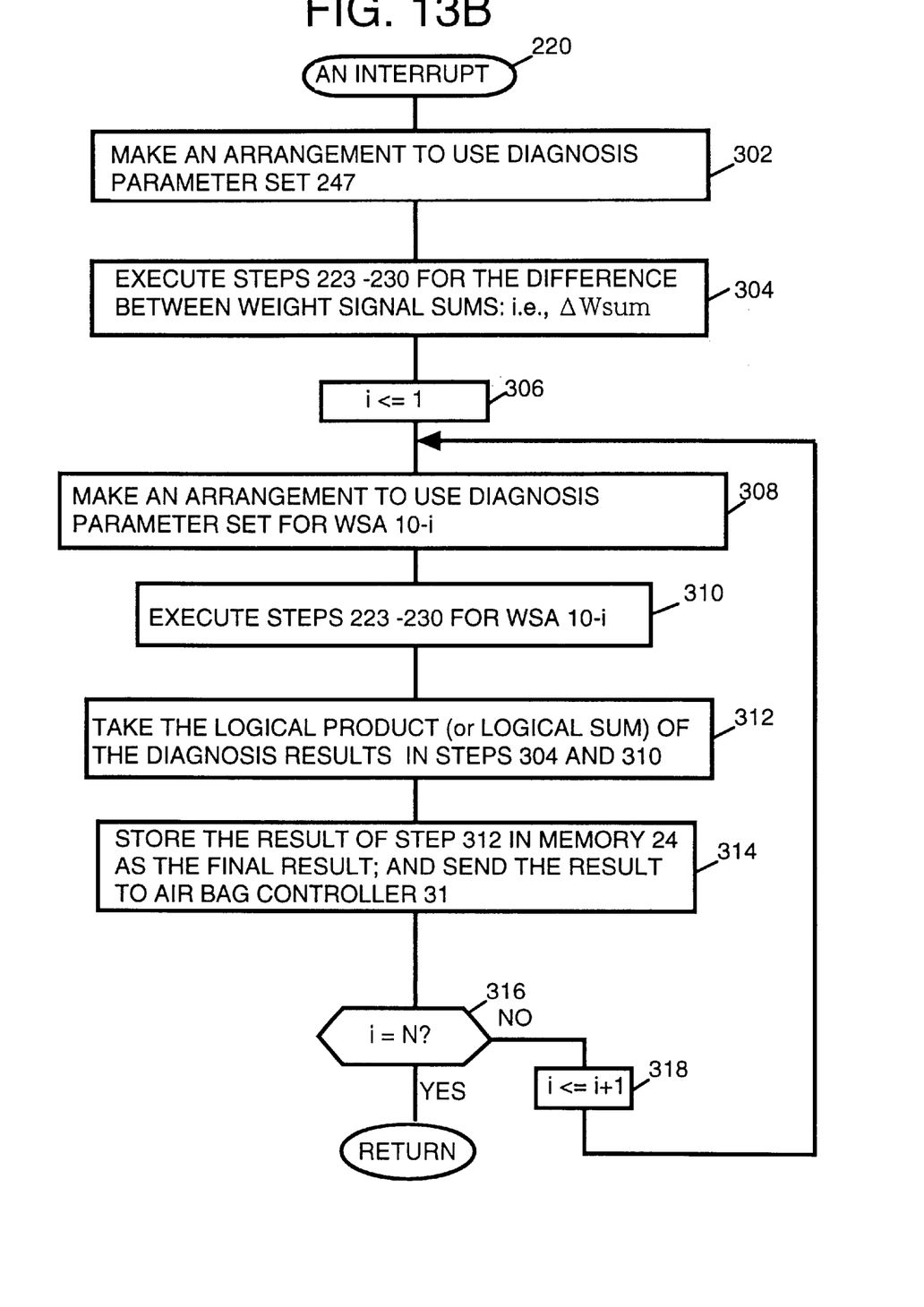
FIG. 13B is a flowchart showing an exemplary self diagnosis operation which uses diagnosis parameter sets of FIG. 13A in accordance with the fourth embodiment.

FIG. 13B is a flowchart showing an exemplary self diagnosis operation which uses diagnosis parameter sets of FIG.13A in accordance with the fourth embodiment. In FIG. 13B, controller 21 makes an arrangement to use diagnosis parameter set 247 in step 302; executes steps 223–230 for the weight signal sum difference ΔWsum in step 304; and sets the WSA-distinguishing suffix 'i' to an initial value 1 for example in step 306. Then, controller 21 makes an arrangement to use diagnosis parameter set for WSA 10-i in step 308; executes steps 223–230 for WSA 10-i in step 310; takes either the logical AND (i.e. logical product) or the logical OR (i.e., logical sum) (which may be determined at the discretion of the designer) of the diagnosis results of steps 304 and 310 in step 312; and stores the result of step 312 in memory 24 as the final result and sends the result to air bag controller 31 in step 314. Controller makes a test to see if i=N in step 316. If so, controller ends the operation. Otherwise, controller 21 increments the WSA-distinguishing suffix 'i' in step 318 and returns to step 308.

If the logical AND is to be calculated in step 312, and if the diagnosis results of steps 304 and 310 are different, then the final result is decided in the prior order of (1) abnormal (an alert is to be given), (2) intermediate between normal and abnormal (zero adjustment is to be made) and (3) normal (zero adjustment is omitted). If the logical OR is to be calculated in step 312, then the final result is decided in the prior order of (3), (2) and (1).

According to the fourth illustrative embodiment of the invention, a seat load measuring system can provide further accurate diagnosis on normalcy/abnormalcy of the WSA 10 systems.

Figure 14:
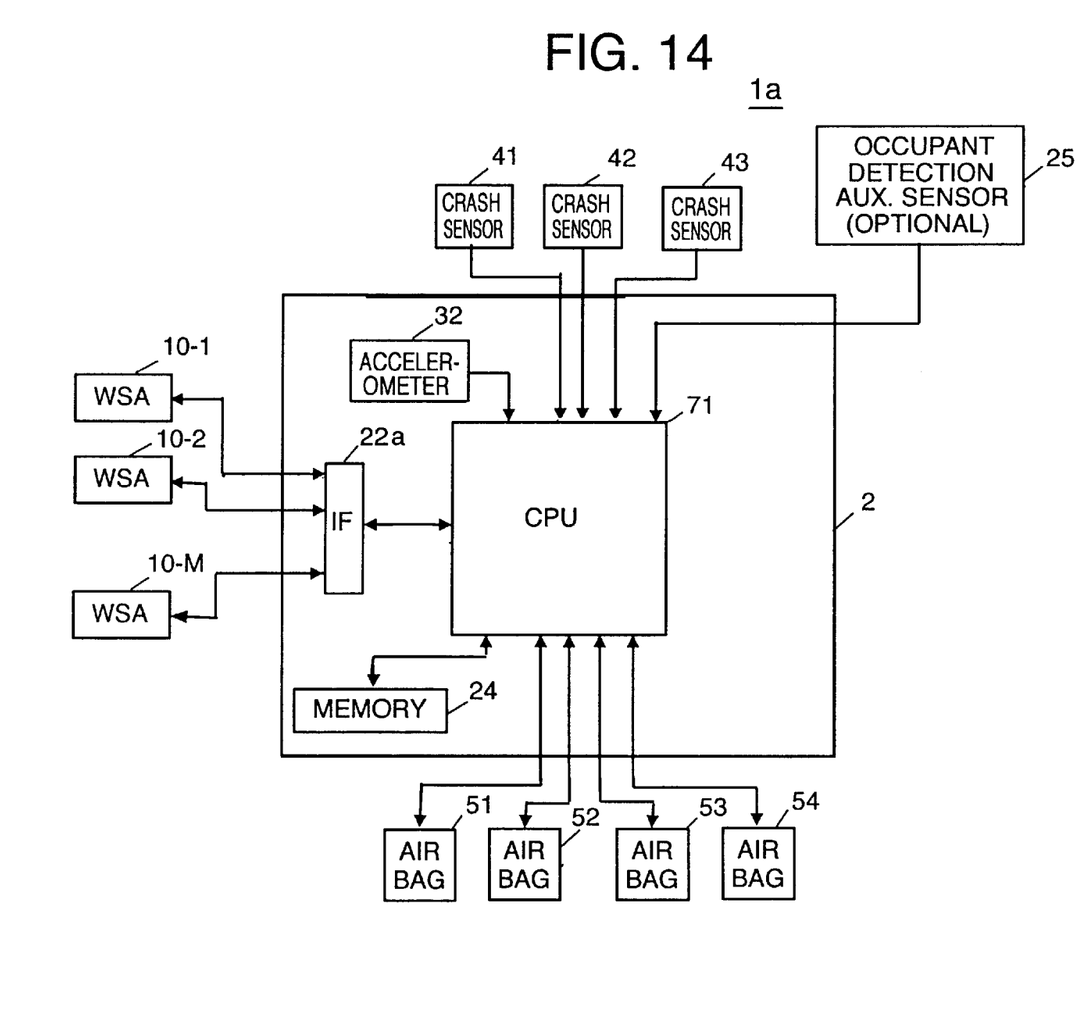
FIG. 14 is a schematic block diagram showing an exemplary arrangement of an air bag system 1a implemented by incorporating controllers 21 and 31 into a single controller.

FIG. 14 is a schematic block diagram showing an exemplary arrangement of an air bag system 1a implemented by incorporating controllers 21 and 31 into a single controller. In this case, all of the WSA's are connected to the interface 22a. If N seats are to be provided with respective weight measuring systems and four WSA's are to be used for each seat, then M will 4N. In this way, controller 21 and controller 31 can be incorporated into a single controller 71. This configuration reduces the size of the overall circuit of the vehicle occupant protection system and eventually reduces the cost of the vehicle occupant protection system.

In the above-described embodiments, the diagnosis in case of the crash signal level v being in a range from V1 to V2 has been made in accordance with a diagnosis map 110 (FIG. 6) or 120 (FIG. 9). However, a seat load measuring system may be configured so as to judge the weight sensors to be intermediate between normal and abnormal if the crash signal level v being in a range from V1 to V2. In this case, the diagnosis parameter set of FIG. 8 has only to include parameters V1 and V2.

It should be noted that the above-described embodiments may be modified and/or combined with each other in various ways.

Many widely different embodiments of the present invention may be constructed without departing from the spirit and scope of the present invention. It should be understood that the present invention is not limited to the specific embodiments described in the specification, except as defined in the appended claims.

What is claimed is:

1. An occupant protection system of a vehicle, the system comprising:

a seat load measuring subsystem which includes
a plurality of weight sensors attached to a vehicle seat, each weight sensor providing a weight signal responsive to a weight load applied thereto;

crash sensing means, responsive to a crash of said vehicle, for outputting a magnitude of said crash;

a controller, responsive to said magnitude of said crash for providing a crash signal determined by said magnitude and, responsive to a decision that said crash signal has reached a predetermined level for providing control information on the basis of said weight signals from said plurality of weight sensors; and occupant protection means, response to said control information, for executing a protection operation, wherein said seat load measuring subsystem further includes:

means responsive to a reception of said crash signal for automatically making a diagnosis on each weight sensor or a zero adjustment of said each weight sensor.

2. An occupant protection system as defined in claim 1, wherein said seat load measuring subsystem further includes:

decision means for deciding whether said diagnosis is necessary or not;

a set of parameters of which at least a part is used as a criterion for diagnosis based on said crash signal; and diagnosis means, responsive to a decision that said diagnosis is necessary, for deciding whether said each weight sensor is normal, abnormal or intermediate between normal and abnormal on the basis of said set of parameters.

3. An occupant protection system as defined in claim 2, wherein said seat load measuring subsystem further includes:
means responsive to a decision that said diagnosis is not necessary for making said zero adjustment of said each weight sensor.

4. An occupant protection system as defined in claim 2, wherein said decision means includes auxiliary means for detecting a presence or a position of an occupant of said vehicle seat.

5. An occupant protection system as defined in claim 2, wherein said seat load measuring subsystem further includes means response to a decision made by said diagnosis means that said each weight sensor is intermediate for making said zero adjustment of said each weight sensor.

6. An occupant protection system as defined in claim 2, further including means, response to a decision made by said diagnosis means that said each weight sensor is abnormal, for providing an alert to a user.

7. An occupant protection system as defined in claim 2, wherein said diagnosis means comprises:
means operative in the event that said level of said crash signal is smaller than a first predetermined value for deciding that said each weight sensor is normal; and
means operative in the event that said level of said crash signal is larger than a second predetermined value which is larger than said first predetermined value for deciding that said each weight sensor is abnormal.

8. An occupant protection system as defined in claim 7, wherein said diagnosis means further comprises:
means operative in the event that said level of said crash signal is in a range from said first predetermined value to said second predetermined value for, regardless of an output level of said each weight sensor, deciding that said each weight sensor is intermediate between normal and abnormal.

9. An occupant protection system as defined in claim 7, wherein said set includes parameters used as a criterion for diagnosis based on said crash signal and said weight signals obtained from said each weight sensor before and after said crash, and wherein said diagnosis means further comprises:
means, operative in the event that said level of said crash signal is in a range from said first predetermined value to said second predetermined value and that a difference between said weight signals before and after said crash is in a larger weight sensor output range defined in said set but is out of a smaller weight sensor output range which is defined in said set and completely included in said larger weight sensor output range, for deciding that said each weight sensor is intermediate.

10. An occupant protection system as defined in claim 9, wherein said larger and smaller weight sensor output ranges remain constant throughout said range from said first predetermined value to said second predetermined value.

11. An occupant protection system as defined in claim 9, wherein said larger and smaller weight sensor output ranges, when expressed in a graph, change in tapered shapes as said level of said crash signal increases from said first predetermined value to said second predetermined value.

12. An occupant protection system as defined in claim 2, wherein said seat load measuring subsystem further comprises:
means for calculating a sum of said weight signals from said plurality of said weight sensors; and
a second set of parameters which is different from said set, said set being adapted to said sum which is larger than a threshold weight value, while said second set being adapted to said sum which is not larger than said threshold weight value, wherein said means for automatically making a diagnosis or a zero adjustment includes:
means for making an arrangement to use suitable one of said set and said second set depending on whether said sum is larger than said threshold weight value.

13. An occupant protection system as defined in claim 2, wherein said means for automatically making a diagnosis or a zero adjustment comprises:
a plurality of diagnosis parameters sets for use in diagnosing all of said weight sensors;
said plurality of diagnosis parameter sets adapted for said weight sensors;
global diagnosis means responsive to a reception of said crash signal for automatically deciding whether all of said weight sensors is normal, abnormal or intermediate between normal and abnormal on the basis of said plurality of diagnosis parameter sets;
means for deciding whether each weight sensor is normal, abnormal or intermediate between normal and abnormal on the basis of one of said diagnosis parameter sets adapted for said each weight sensor to provide an interim result; and
means for calculating a logical product or sum between the decision of said global diagnosis means and said interim result for said each weight sensor to provide a final diagnosis result for said each weight sensor.

14. An integrated circuit for use in an occupant protection system of a vehicle wherein the occupant protection system includes a plurality of weight sensors attached to a vehicle seat, each weight sensor providing a weight signal responsive to a weight load applied thereto; a crash sensor for providing a magnitude of a crash; and occupant protection means responsive to control information from the external for providing a protection, the integrated circuit comprising;
means responsive to said magnitude of said crash for providing a crash signal;
mean responsive to said crash signal for generating said control information on the basis of said weight signals from said plurality of weight sensors;
means responsive to a reception of said crash signal for automatically making a diagnosis on said each weight sensor or a zero adjustment of said each weight sensor.

15. An integrated circuit as defined in claim 14, further including:
decision means for deciding whether said diagnosis is necessary or not;
a set of parameters of which at least a part is used as a criterion for diagnosis based on said crash signal; and
diagnosis means, responsive to a decision that said diagnosis is necessary, for deciding whether said each weight sensor is normal, abnormal or intermediate between normal and abnormal on the basis of said set.

16. An integrated circuit as defined in claim 15, further including:
means responsive to a decision that said diagnosis is not necessary for making said zero adjustment of said each weight sensor.

17. An integrated circuit as defined in claim 15, wherein said set includes parameters used as a criterion for diagnosis based on said crash signal and said weight signals obtained from said each weight sensor before and after said crash.

18. A seat load measuring system for use in an occupant protection system of a vehicle wherein the occupant protection system includes means responsive to a detection of a crash for providing a crash signal and means responsive to said crash signal for executing a protection operation on the basis of control information provided by the seat load measuring system, the seat load measuring system including;

a plurality of weight sensors attached to a vehicle seat, each weight sensor providing a weight signal responsive to a weight load applied to said each weight sensor, said weight signal being used either as said control information or for generating said control information; and means responsive to a reception of said crash signal for automatically making a diagnosis on each weight sensor or a zero adjustment of said each weight sensor.

19. A seat load measuring system as defined in claim 18, wherein said means for automatically making a diagnosis further includes:

decision means for deciding whether said diagnosis is necessary or not;

a set of parameters of which at least a part is used as a criterion for diagnosis based on said crash signal; and diagnosis means, responsive to a decision that said diagnosis is necessary, for deciding whether said each weight sensor is normal, abnormal or intermediate between normal and abnormal on the basis of said set of parameters.

20. A seat load measuring system as defined in claim 18, further including means response to a decision that said each weight sensor is intermediate for making a zero adjustment of said each weight sensor.

21. A seat load measuring system as defined in claim 18, further including means response to a decision that said each weight sensor is abnormal for providing an alert to a user.

22. A seat load measuring system as defined in claim 18, wherein said diagnosis means comprises:

means operative in the event that a level of said crash signal is smaller than a first predetermined value for deciding that said each weight sensor is normal; and means operative in the event that said level of said crash signal is larger than a second predetermined value which is larger than said first predetermined value for deciding that said each weight sensor is abnormal.

23. A seat load measuring system as defined in claim 22, wherein said diagnosis means further comprises:

means operative in the event that said level of said crash signal is in a range from said first predetermined value to said second predetermined value for, regardless of an output level of said each weight sensor, deciding that said each weight sensor is intermediate between normal and abnormal.

24. A seat load measuring system as defined in claim 22, wherein a set of parameters includes parameters used as a criterion for diagnosis based on said crash signal and said weight signals obtained from said each weight sensor before and after said crash, and wherein said diagnosis means further comprises:

means, operative in the event that said level of said crash signal is in a range from said first predetermined value to said second predetermined value and that a difference between said weight signals before and after said crash is in a larger weight sensor output range defined in said set but is out of a smaller weight sensor output range which is defined in said set and completely included in said larger weight sensor output range, for deciding that said each weight sensor is intermediate.

25. A seat load measuring system as defined in claim 24, wherein said larger and smaller weight sensor output ranges remain constant throughout said range from said first predetermined value to said second predetermined value.

26. A seat load measuring system as defined in claim 24, wherein said larger and smaller weight sensor output ranges, when expressed in a graph, change in tapered shapes as said level of said crash signal increases from said first predetermined value to said second predetermined value.

27. A seat load measuring system as defined in claim 19, further including:

means for calculating a sum of said weight signals from said plurality of said weight sensors; and a second set of parameters which is different from said set, said set being adapted to said sum which is larger than a threshold weight value, while said second set being adapted to said sum which is not larger than said threshold weight value, wherein said means for automatically making a diagnosis or a zero adjustment includes:

means for making an arrangement to use suitable one of said set and said second set depending on whether said sum is larger than said threshold weight value.

28. A seat load measuring system as defined in claim 19, wherein said means for automatically making a diagnosis or a zero adjustment comprises:

a plurality of diagnosis parameter sets for use in diagnosing all of said weight sensors;

said plurality of diagnosis parameter sets adapted for said weight sensors;

global diagnosis means responsive to a reception of said crash signal for automatically deciding whether all of said weight sensors is normal, abnormal or intermediate between normal and abnormal on the basis of said plurality of diagnosis parameter sets;

means for deciding whether each weight sensor is normal, abnormal or intermediate between normal and abnormal on the basis of one of said diagnosis parameter sets adapted for said each weight sensor to provide an interim result; and means for calculating a logical product or sum between the decision of said global diagnosis means and said interim result for said each weight sensor to provide a final diagnosis result for said each weight sensor.

29. An integrated circuit for use in a seat load measuring device of an occupant protection system of a vehicle wherein the seat load measuring device includes a plurality of weight sensors attached to a vehicle seat, each weight sensor providing a weight signal responsive to a weight load applied thereto, wherein the occupant protection system includes means responsive to a detection of a crash for providing a crash signal determined by a magnitude of the crash and means responsive to a detection of the crash for executing a protection operation on the basis of information provided by the integrated circuit, the integrated circuit including;

means for providing said information that is calculated from said weight signals from said plurality of weight sensors; and means responsive to a reception of said crash signal for automatically making a diagnosis on said each weight sensor or a zero adjustment of said each weight sensor.

30. An integrated circuit as defined in claim 29, wherein said means for automatically making a diagnosis or a zero adjustment includes:

decision means for deciding whether said diagnosis is necessary or not;

a set of parameters of which at least a part is used as a criterion for diagnosis based on said crash signal; and diagnosis means, responsive to a decision that said diagnosis is necessary, for deciding whether said each weight sensor is normal, abnormal or intermediate between normal and abnormal on the basis of said set of parameters.

31. An integrated circuit as defined in claim 30, wherein said means for automatically making a diagnosis or a zero adjustment includes:

means response to a decision made by said diagnosis means that said each weight sensor is intermediate for making said zero adjustment of said each weight sensor.

32. An integrated circuit as defined in claim 30, wherein said diagnosis means includes:

means operative in the event that a level of said crash signal is smaller than a first predetermined value for deciding that said each weight sensor is normal; and means operative in the event that said level of said crash signal is larger than a second predetermined value which is larger than said first predetermined value for deciding that said each weight sensor is abnormal.

33. An integrated circuit as defined in claim 32, wherein said diagnosis means further includes:

means operative in the event that said level of said crash signal is in a range from said first predetermined value to said second predetermined value for, regardless of an output level of said each weight sensor, deciding that said each weight sensor is intermediate between normal and abnormal.

34. An integrated circuit as defined in claim 32, wherein said set includes parameters used as a criterion for diagnosis based on said crash signal and said weight signals obtained from said each weight sensor before and after said crash, and wherein said diagnosis means further includes:

means, operative in the event that said level of said crash signal is in a range from said first predetermined value to said second predetermined value and that a difference between said weight signals before and after said crash is in a larger weight sensor output range defined in said set but is out of a smaller weight sensor output range which is defined in said set and completely included in said larger weight sensor output range, for deciding that said each weight sensor is intermediate.

\* \* \* \* \*